Feb. 21, 1939.  R. B. BAGBY  2,147,686
NOZZLE FOR FILLING MACHINES
Filed Dec. 11, 1937  2 Sheets-Sheet 1
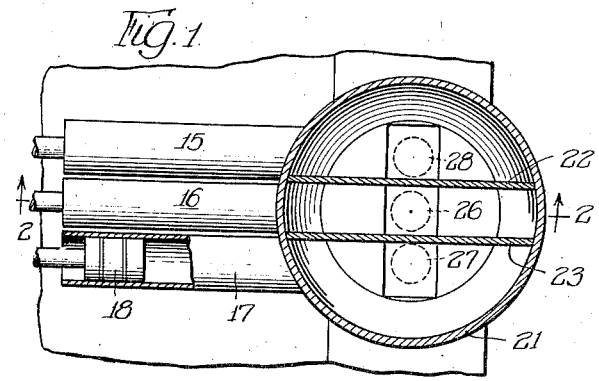
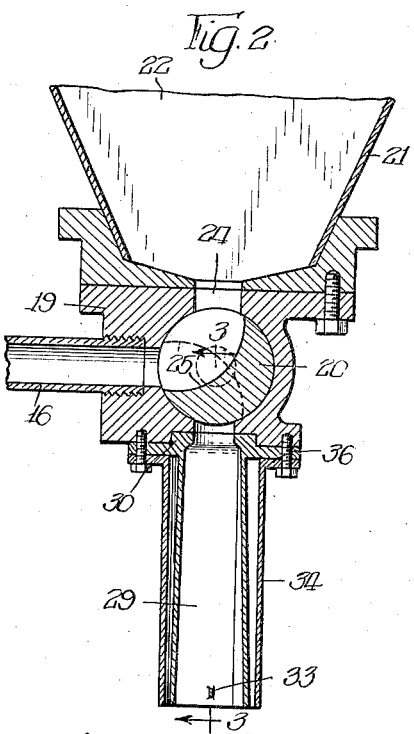
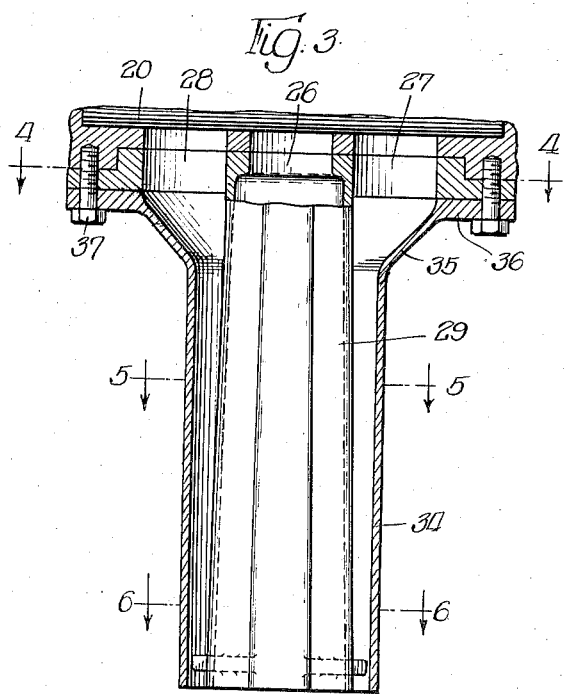
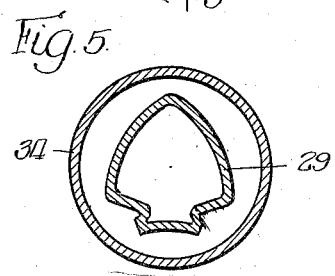
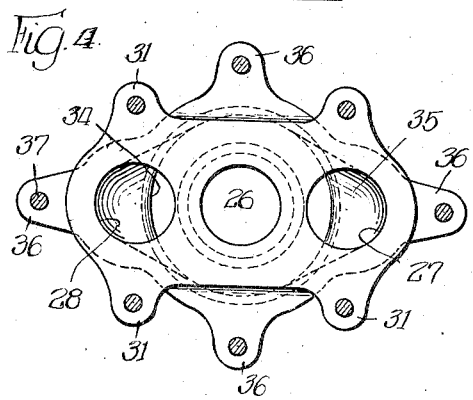
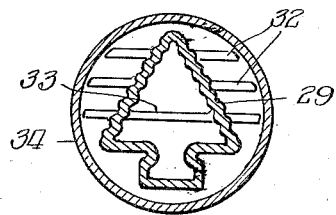
Inventor:
Ralph B. Bagby, Feb. 21, 1939.   R. B. BAGBY   2,147,686
NOZZLE FOR FILLING MACHINES
Filed Dec. 11, 1937   2 Sheets-Sheet 2
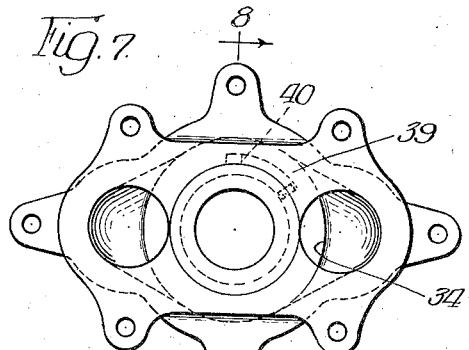
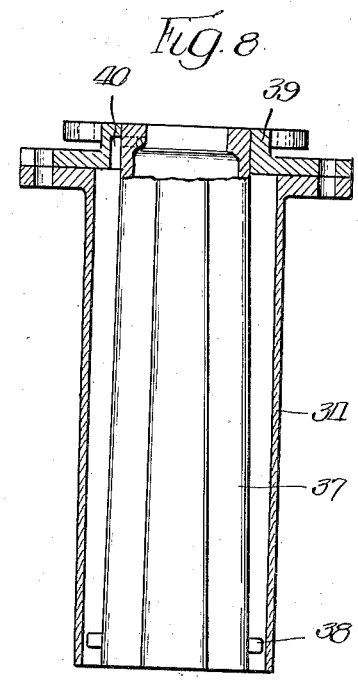
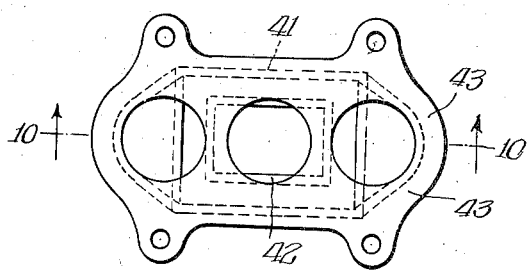
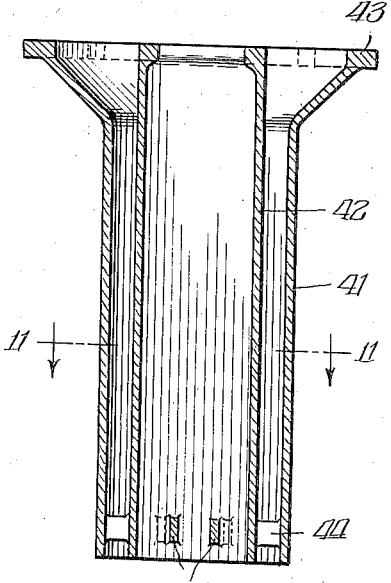
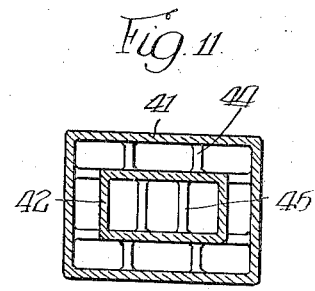
Inventor:
Ralph B. Bagby, Patented Feb. 21, 1939

2,147,686

UNITED STATES PATENT OFFICE 2,147,686

NOZZLE FOR FILLING MACHINES

Ralph B. Bagby, Evanston, Ill.

Application December 11, 1937, Serial No. 179,278

6 Claims. (Cl. 226—100)

My invention relates to filling machines and particularly to a nozzle therefor, adapted to function to discharge ice creams or ices into a container in such manner as to produce a design extending from top to bottom of the body of material.

In the sale of frozen desserts, it has become common to provide individual packages in the form of cups, the ice cream or ice being delivered to the cups in such manner that a design of some kind is outlined in the cream in a contrasting color. For example, the exterior, or body of the cream will be of a light or cream color, while the center or core will be outlined in the form of a heart, a Christmas tree or some such design, in a colored cream.

Considerable difficulty has been experienced in designing a nozzle that will function to bring about the desired result and to insure a sharp outline of the design selected. Furthermore, it has been found inconvenient to provide for a substitution of parts that will enable the molding of different designs. In addition, difficulty has been experienced in providing a construction that may readily be cleaned and kept sanitary.

The described difficulties have been overcome in the design here disclosed, a detailed description of which follows:

The invention will be more readily understood by reference to the accompanying drawings, in which Fig. 1 is a fragmentary plan view of the pertinent parts of a filling machine to which my improvements have been applied;

Fig. 2 is a sectional view on the line 2—2 of Fig. 1;

Fig. 3 is a view somewhat enlarged on the line 3—3 of Fig. 2;

Fig. 4 is a plan view of the construction shown in Fig. 3, the view being taken on the section line 4—4 of Fig. 3;

Figs. 5 and 6 are sectional views on the lines 5—5, 6—6 of Fig. 3;

Fig. 7 is a plan view of a slightly modified construction in which the core or design-forming tube is removable;

Fig. 8 is a sectional view on the line 8—8 of Fig. 7;

Fig. 9 is a plan view of a still further modified form of the invention;

Fig. 10 is a sectional view on the line 10—10 of Fig. 9, and;

Fig. 11 is a sectional view on the line 11—11 of Fig. 10.

In the drawings I have illustrated a portion of a filling machine having three cylinders 15, 16, 17, each having a piston 18 which is caused to reciprocate by suitable mechanism, not shown. The cylinders terminate in a casting 19 having a cylindrical three-way valve 20 therein. A hopper 21 is mounted above the valve, the hopper having two partitions 22—23, thus providing three compartments open at their lower ends to suitable passages, one of which is indicated at 24 in Fig. 2, the passages communicating with corresponding recesses in the valve 20 when the valve is properly positioned. In Fig. 2 the valve has been shifted to place the middle compartment of the hopper in communication with the cylinder 16. Upon retraction of the piston, the material in the compartment is drawn into the cylinder and upon rotation of the valve 20 to the position indicated by the dotted line 25, the cylinder is placed in communication with the center port 26, the piston causing the ejection of the contents of the cylinder into the central tube of the nozzle.

The same is true as to the operation of the cylinders 16, 17, such cylinders being placed in communication with the ports 27, 28 in the nozzle, the action as to all three cylinders being simultaneous. Preferably, the design will be such that the cylinder diameter and the piston stroke will be the same as to all cylinders, whereby there is double the quantity of material discharged into the space constituting the outer portion of the filled package over that discharged into the core.

In the nozzle construction shown in Figs. 2 to 6, the nozzle is constructed in two parts. The inner tube 29 is cast as a part of a flanged head 30 having the three ports 26, 27, 28 therein and adapted to be joined by bolts through the ears 31 to the casting 19. The cross-sectional contour of the tube 29 may be selected as desired. In the form illustrated in the drawings, a Christmas tree is shown, the shape being gradually outlined from the upper to the lower, or outlet end.

At its lower end, I provide a plurality of cross bars 32 on the exterior and one or more such bars 33 on the interior to act as dams or obstructions to the flow of the plastic material. These have the purpose of substantially equalizing the areas of the outlets from the tubes and preventing the cream from dripping out between successive discharges. These barriers or dams are cast as a part of the complete structure. It has been found in practice that a construction formed in sheet metal was difficult to make and was subject to the danger by bending and distortion through handling. It will be noted that the center tube is slightly flaring from the top to the bottom, this being necessary in order to provide full size ports at the top to receive the material through the valve.

The outer tube 34 is cylindrical and circular in cross section, it being designed for filling round cups or containers. At its upper end the tubular member is flared as at 35 merging into a flange to provide ears 36 for attachment by bolts 37 to the casting 19. Separate attaching bolts are used for the inner and outer tubes in order that the outer tube may be removed separately for cleaning purposes without disturbing the inner tube.

In the construction of Figs. 7 and 8 there is no change in the exterior tube 34. However, the interior tube 37, while of the same contour and having the same barriers 38 formed at its lower end, is separate from the head casting 39, said casting otherwise being the same as that shown in Figs. 2 and 3. In order to join the tube 37 to the head, I provide a bayonet joint indicated generally by the numeral 40 as the result of the provision of which the tube may be separately and indepedently removed from its operative position, thoroughly cleaned and returned without disturbing the fastening bolts for either of the tubes. The outer tube being smooth and without internal obstructions may readily be cleaned without removal.

In the construction of Figs. 9, 10 and 11, a square design is introduced, the packages being square and a square or rectangular design being provided for the inner section. However, the outer tube 41, the inner tube 42 and the flanged head 43 with its attaching ears are all cast in a single piece including therewith the barriers 44—45 at the lower end. This is an extremely simple construction that may readily be removed, but cleaning is more difficult both in operation and in the original production of the casting. It has a number of advantages, however, both in the matter of cost, simplicity of attachment and the impossibility of mistake by operators of the machine.

It will be understood that the particular designs and the particular form in which the parts are used are not important; thus I do not wish to be limited except as indicated in the appended claims.

I claim:

1. In a filling machine having a plurality of cylinders and a valve for automatically placing said cylinders alternately in communication with a hopper and with a nozzle, the combination of a nozzle having three inlet ports and a pair of telescoped tubes, two of said ports being in communication with the space between the inner and outer tubes and one of said ports being in communication with the inside of the inner tube, the inner tube having a cross-sectional contour at its lower end to correspond to a desired design for the discharged material, and cross bars or barriers integral with the inner-tube extending across the outlet space in the outer tube near the lower end of the nozzle.

2. A nozzle for filling machines comprising, in combination, telescoped tubes, the space within each tube having a separate inlet port, said tubes each having an attaching head and being separately removable for cleaning, and a plurality of separated cross-bars integral with the inner-tube extending across the outlet from the outer tube, whereby to substantially equalize the outlet areas of the two tubes.

3. A nozzle for a filling machine adapted to fill two flavors or colors in a single package with a design for the inner section of material, comprising the combination with the cylinders and valve of a filling machine, of a pair of separate castings each having an attaching head and depending telescoped, spaced-apart tubes, the inner tube having at its outlet end a cross sectional contour corresponding to the desired design to be produced in the container for discharged material, and barrier lugs integral with the inner-tube extending across the outlet space near the lower end of the tube having the larger outlet area whereby to substantially equalize the outlet areas of the two tubes.

4. In a filling machine, the combination of a valve casing and a valve therein, said valve having multiple passages, means providing ports in said casing registering with said passages, and a spout comprising inner and outer spaced apart tubes, the inner tube having a cross section at its discharge end corresponding to a desired design, said inner and outer tubes in communication with respective inlet ports from the valve, said inner and outer tubes being separate and individually attached to said valve casing, and bars integral with and projecting from the outer wall of the inner tube and extending across the outlet from the outer tube, said bars being designed and arranged to intersect any open space of substantial area and to substantially equalize the outlet area of the two tubes.

5. In a filling machine having a plurality of cylinders and a valve for placing said cylinders alternately in communication with a hopper and a nozzle, the combination with the valve body, of a nozzle comprising inner and outer tubes, the spaces within which are open to the respective valve passages, said tubes having head flanges, the flange of the outer tube overlying that of the inner tube, and means for separately attaching said tubes through said flanges to the valve body whereby the outer tube may be removed separately from the inner tube.

6. In a filling machine having a plurality of cylinders and a valve for placing said cylinders alternately in communication with a hopper and a nozzle, the combination with the valve body, of a nozzle comprising inner and outer tubes, the spaces within which are open to the respective valve passages, said tubes having head flanges, the flange of the outer tube overlying that of the inner tube, and means for separately attaching said tubes through said flanges to the valve body whereby the outer tube may be removed separately from the inner tube, the inner tube having projections from its outer surface near its lower end for reducing the outlet area of the outer tube.

RALPH B. BAGBY.